United States Patent [19]
Batchelder

[11] Patent Number: 5,491,643
[45] Date of Patent: Feb. 13, 1996

[54] METHOD FOR OPTIMIZING PARAMETERS CHARACTERISTIC OF AN OBJECT DEVELOPED IN A RAPID PROTOTYPING SYSTEM

[75] Inventor: John S. Batchelder, Somers, N.Y.

[73] Assignee: Stratasys, Inc., Eden Prairie, Minn.

[21] Appl. No.: 191,906

[22] Filed: Feb. 4, 1994

[51] Int. Cl.⁶ ............................. G06F 17/17; G06T 17/30
[52] U.S. Cl. .................... 364/512; 364/560; 364/562; 364/563; 364/565; 264/40.1; 264/46.4; 395/119; 395/125; 382/203
[58] Field of Search ....................... 364/512, 561, 364/413.28, 560, 562, 563, 565, 566; 382/21, 25; 378/35; 264/40.1, 46.4; 395/119, 125

[56] References Cited

U.S. PATENT DOCUMENTS

| | | | |
|---|---|---|---|
| 3,927,948 | 12/1975 | Cox et al. | 364/512 |
| 4,837,732 | 6/1989 | Brandestini et al. | 364/413.28 |
| 4,876,728 | 10/1989 | Roth | 382/21 |
| 4,928,233 | 5/1990 | Millis | 364/512 |
| 5,115,456 | 5/1992 | Kimura et al. | 378/35 |
| 5,218,427 | 6/1993 | Koch | 364/561 |
| 5,231,470 | 7/1993 | Koch | 364/561 |
| 5,255,206 | 10/1993 | Pegis | 364/512 |
| 5,260,009 | 11/1993 | Penn | 264/40.1 |
| 5,297,057 | 3/1994 | Kramer et al. | 364/512 |

Primary Examiner—Emanuel T. Voeltz
Assistant Examiner—Alan Tran
Attorney, Agent, or Firm—Moore & Hansen

[57] ABSTRACT

A method suitable for optimizing parameters characteristic of a preselected portion of an object developed in a rapid prototyping system. The method comprises the steps of identifying an object characteristic space comprising at least one dimension, the or each dimension defining a continuum for one object parameter; and, selecting a predetermined subset of said object characteristic space comprising desired optimal characteristics of the preselected portion of the object.

10 Claims, 8 Drawing Sheets

FIG. 3

TEXT I

| OBJECT | DENSITY | COLOR | ELASTIC MODULES | % ELONGATION | DUROMETER |
|---|---|---|---|---|---|
| 14 SKIN PANEL | <2 | RED | ≥3 × 10$^4$ psi (ALL DIRECTIONS) | >2 | — |
| 16 WINDOW | <2 | CLEAR | ≥3 × 10$^4$ psi (ALL DIRECTIONS) | >2 | — |
| 18 GASKET | — | BLACK | — | — | 14 |
| 20 HANDLE | <.3 | RED | — | — | 27 |
| 22 HINGE BUSHING | — | — | >10$^6$ psi (HOOP STRAIN) | 0.2 | — |
| 24 PIN HOLE | 0 | — | — | — | — |
| 26 HINGE BRACKET | — | — | >10$^5$ psi (TENSILE STRAIN) | >1 | — |

FIG. 4
TABLE II

| MATERIAL | DENSITY | COLOR | ELASTIC MODULES ASTM D790 | % ELONGATION ASTM B638 | DUROMETER ASTM 2240 |
|---|---|---|---|---|---|
| A. AIR | 0.001 | CLEAR | 0 | — | 0 |
| B. POLYSTYRENE | 1.04 | RED | $3.9 \times 10^5$ psi | 2.2% | — |
| C. EVA | 0.96 | BLACK | $2 \times 10^4$ psi | 320% | 14 |
| D. EVA | 0.96 | CLEAR | $4 \times 10^4$ psi | 500% | 27 |
| E. BISMUTH ALLOY | 9.5 | GRAY | $2 \times 10^6$ psi | 0.2% | — |

FIG. 7

TABLE III

| OBJECT | DENSITY | COLOR | ELASTIC MODULES | % ELONGATION | DUROMETER |
|---|---|---|---|---|---|
| 14 SKIN PANEL | ABCD | B | BDE | ABCD | ABCDE |
| 16 WINDOW | ABCD | AD | BDE | ABCD | ABCDE |
| 18 GASKET | ABCDE | C | ABCDE | ABCDE | C |
| 20 HANDLE | A | B | ABCDE | ABCDE | D |
| 22 HINGE BUSHING | ABCDE | ABCDE | E | ABCDE | ABCDE |
| 24 PIN HOLE | A | ABCDE | ABCDE | ABCDE | ABCDE |
| 26 HINGE BRACKET | ABCDE | ABCDE | BE | ABCD | ABCDE |

FIG. 8

TABLE IV

| OBJECT | steps: a | b | c | d | e | f | g | h | a | b | c | d | e |
|---|---|---|---|---|---|---|---|---|---|---|---|---|---|
| 14 SKIN PANEL | | | | | ⟨B,D⟩ | | | | | | | | |
| 16 WINDOW | | ⟨D⟩ | | | | | | | | | | | |
| 18 GASKET | | ⟨C⟩ | | | | | | | | | | | |
| 20 HANDLE | | | | | | | | HANDLE SKIN | | | | ⟨B,D⟩ | |
| | | | | | | | | HANDLE VOLUME | | | | | ⟨A,D⟩ |
| 22 HINGE BUSHING | | | | | | ⟨D,E⟩ | | | | | | | |
| 24 PIN HOLE | | ⟨A⟩ | | | | | | | | | | | |
| 26 HINGE BRACKET | | | | ⟨B,D⟩ | | | | | | | | | |

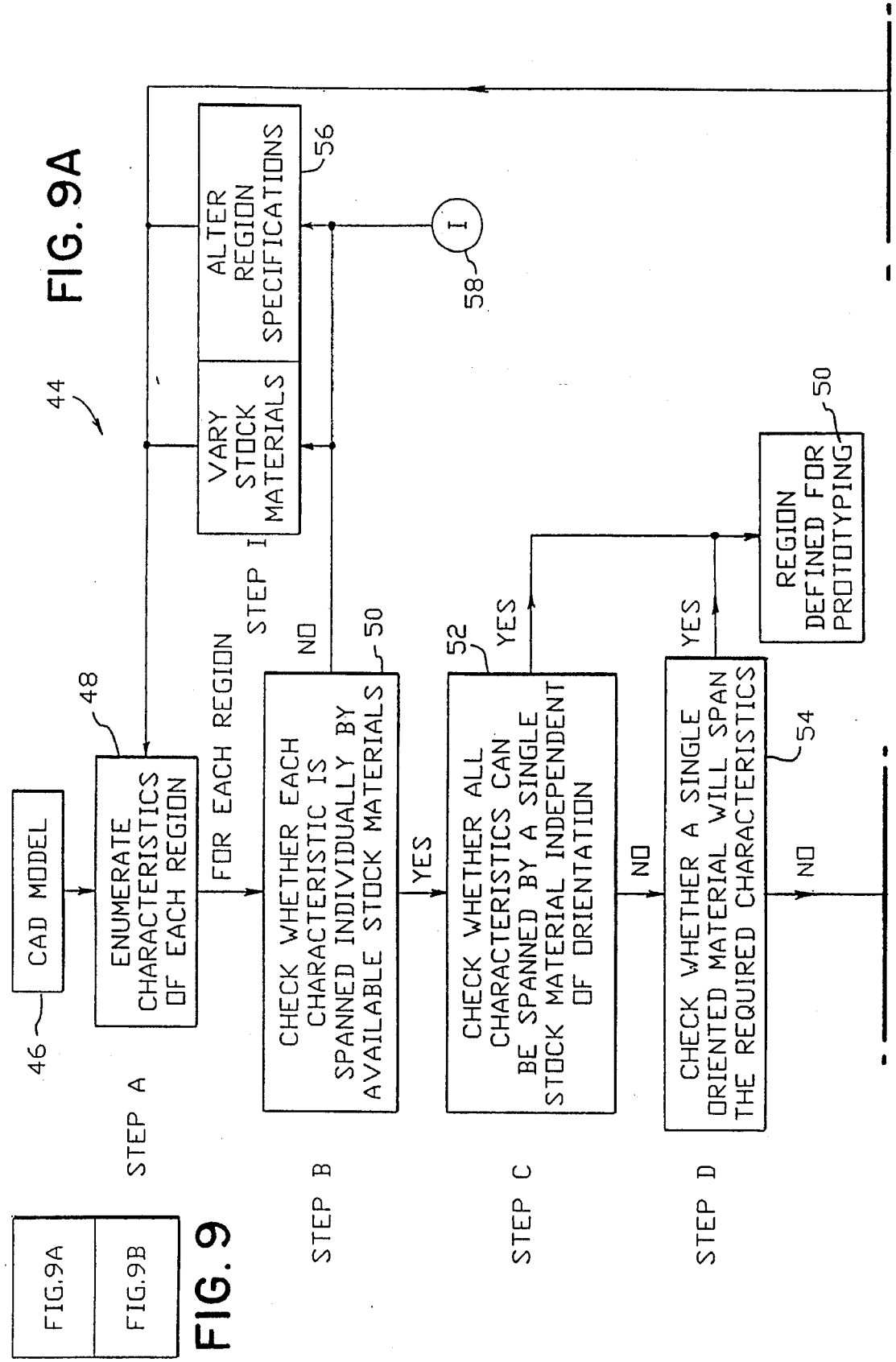

METHOD FOR OPTIMIZING PARAMETERS CHARACTERISTIC OF AN OBJECT DEVELOPED IN A RAPID PROTOTYPING SYSTEM

BACKGROUND OF THE INVENTION

1. Field of the Invention

This invention relates to a method for optimizing parameters characteristic of an object developed in a rapid prototyping system.

2. Introduction to the Invention

A rapid prototyping system (RPS) includes techniques for making three-dimensional objects of predetermined design. For example, RPS techniques include making three-dimensional objects by building up material in a pattern. The building up step may comprise a process wherein, in response to data automatically provided from a computer aided design (CAD) system, a stream of homogenous particles may be ejected from a supply head and directed to a set of coordinates of the three-dimensional object. Further reference on RPS techniques may be made for example to J. S. Batchelder, H. W. Curtis, R. R. Jackson, and J. D. Mackay, "Producing Three-Dimensional Parts From Computer Design Data", IBM Technical Disclosure Bulletin, Vol. 33, No. 5, 1990, pp. 146–7; similarly see V. Valavaara, "Topology Fabrication Apparatus", U.S. Pat. No. 4,749,347.

SUMMARY OF THE INVENTION

Our work is to extend and further develop the potentialities and capabilities of a rapid prototyping system, by way of a novel method to be disclosed below. To this end, we first set forth the following two points.

First, we specify desired characteristics of an object developed in accordance with objectives of the novel method. Concomitantly, we show that to satisfy these objectives, problems arise de novo, whose solution, in fact, leads to a recital of the novel method. Second, we argue that the prior art RPS techniques are silent as to our objectives and problems, and what is suggested by the prior art is insufficient to solve the problems or realize these objectives.

Point One

We note at the outset that desired characteristics of an object developed in accordance with the novel method, may have, from the vantage point of the prior art, a seemingly paradoxical or antithetical aspect.

Thus, for example, it may be desired that a prototype of a car frame comprises a stiff attachment zone and a high modulus of elasticity, while a contiguous soft crumple zone comprises, inversely, a low modulus of elasticity.

Again, for a second example, a prototype strut may comprise a strong brittle (machinable) zone for drilling and tapping, a low density filler zone for thermal isolation, and a high tensile strength flexible tension member.

A third example of how antithetical aspects of desired characteristics of an object may arise, is based on the following situation. Here, we specify that desired characteristics of an object simultaneously satisfy three constraints:
(1) sticky and hard;
(2) stiff and strain free under thermal cycling;
(3) flexible and grindable.

As to the parameters defining sticky and hard, respectively, we note the following. The object may comprise material which adheres to previously deposited object material. This consideration suggests a glue of some kind. Thus, as plasticizer is added to most plastics, the material will display a requisite stickiness. However, as the plasticizer is added, an ability of the material to support sheer and tensile stresses, sharply drops.

Accordingly, while an optimal material in satisfaction of the desired characteristics, sticky and hard, would, for example, putatively have a stickiness of ethyl vinyl acetate (EVA) thermal plastic adhesives, and a Young's modulus of polyacetal i.e., a very strong (300,000 psi) liquid crystalline thermal plastic, mixtures of these two entities, EVA and polyacetal, tend to produce an unsatisfactory material comprising EVA's modulus (about 3,000 psi) and polyacetal self-adhesion (non-existent).

As to the parameters defining stiff and strain free under thermal cycling, we note the following.

If a thermal process is used to cause material to quickly undergo a transition from liquid to solid, it is usually accompanied by thermal contraction i.e., there is an (undesired) dimensional change. Again, if chemical reaction or solvent evaporation causes solidification (it typically must occur in a few seconds), there is usually an (undesired) dimensional change. Further, if the material solidifies prior to achieving its final shape (e.g., it cools to a solid form at 250° F., and then shrinks as it cools the rest of the way to room temperature), large (undesirable) stresses can build up in the object due to the forces the solid material can exert on the existing object. On the other hand (antithetically), if the material is sufficiently soft even at room temperature, so that the recently deposited material yields to conform to the rest of the object as the recently deposited material sets, then distortions such as curl can be kept manageably small: such a material, however, is not strong at room temperature and this for the same reason that it does not distort.

As to the parameters defining flexible and grindable, we note the following. On the one hand, for all object not to break when it is dropped or flexed, it should be resilient. On the other hand (antithetically), for an object surface to be grindable (sandable), the material should chip and break off when placed under significant local stress.

We now summarize the first point. The three examples demonstrate that for a specification of desired characteristics of an RPS object, in accordance with our novel method, one may be confronted, in aggregate, with seemingly antithetical demands on materials, at least from the vantage point of the prior art, which demands may thwart a realization of such an object using conventional RPS techniques. Moreover, the three examples are merely illustrative of a general situation. There can be, in fact, hundreds of visual, functional, economic, geometric and pragmatic constraints on the design characteristics of an object developed in RPS.

Point Two

The prior art is silent as to our objective of realizing RPS objects that are in satisfaction of complex and seemingly antithetical design characteristics. What may be inferred from the prior art is that it encompasses simply a lesser realm, where objects comprise homogenous materials, and the materials are not random or isotropic.

Restated, the prior art is not cognizant of the types of questions or problems we pose for ourselves, namely, how can a material or a combination of materials be found that will simultaneously satisfy all—even antithetical—design constraints? What kind of methodology can be articulated which can optimally direct one to such a material(s)? Positive answers to these questions, clearly, posit new potentialities and capabilities for RPS.

The novel method of the present invention addresses these problems and answers these questions. In particular, the novel method is suitable for optimizing parameters characteristic of a preselected portion of an object developed in a rapid prototyping system, and comprises the steps of:

(1) identifying an object characteristic space comprising at least one dimension, the or each dimension defining a continuum for one object parameter; and (2) selecting a predetermined subset of said object characteristic space comprising desired optimal characteristics of the preselected portion of the object.

The advantages of the novel method, as defined, are manifold and include an extension and further development of the potentialities and capabilities of extant rapid prototyping systems. For example, an RPS object, or a preselected geometric portion of an RPS object, may now comprehend design characteristics that from the vantage of conventional RPS techniques, present seemingly mutually exclusive design constraints, impossible of realization. Further advantages of the novel method proceed from the following considerations.

First, we have discovered that a unique strength of rapid prototyping tools is that, since by design they can build up a final object by adding a small amount of material at a precise location, they are well suited to making organized composites of different homogenous materials. The resulting objects are different from prior art composites, in that locations of homogeneous sub-regions may be geometrically preselected and processed in accordance with the novel method i.e., they are not random or isotropic. Accordingly, a great advantage may be secured by way of the novel method: different functional areas of a completed object can now have different specified characteristics.

Additionally, we have recognized and overcome a problem immanent in the prior art; namely, that the physical properties of individual stock materials may preclude simultaneous processing. For example, pursuant to prior art techniques, one might attempt to make a three dimensional circuit board by extruding beads of metal alloy in some portions of an object and filling the remainder with a polymer insulator. However, the densities, surface chemistries and viscosities of the two homogenous materials are so different that at processing temperatures the materials quickly separate into a useless parfait. The novel method, in sharp contrast, can obviate this type of deficiency.

The novel method, moreover, has another important advantage, since the proportions and locations of homogeneous materials in a final object can be specified automatically at the time the object is made, by a designer specifying the desired proportions of the final object. For example, a designer may specify a sequence of durometers (rubber hardness) and print the same object at each point in the sequence, to find out which durometer best combines compressive force and seal integrity in a functional test.

BRIEF DESCRIPTION OF THE DRAWING

The invention is illustrated in the accompanying drawing, in which

FIG. 3 comprises a Table I developed as an example of specified characteristics of preselected regions of an object 10;

FIG. 4 comprises a Table II developed as an example of characteristics of stock materials from which object 10 is to be created;

FIG. 7 comprises a Table III developed as an example of one step of the method of the present invention;

FIG. 8 comprises a Table IV in further illustration of steps of the method of the present invention.

DETAILED DESCRIPTION OF THE INVENTION

The novel method is suitable for optimizing parameters characteristic of a preselected portion of an object developed in a rapid prototyping system.

Figure 1:
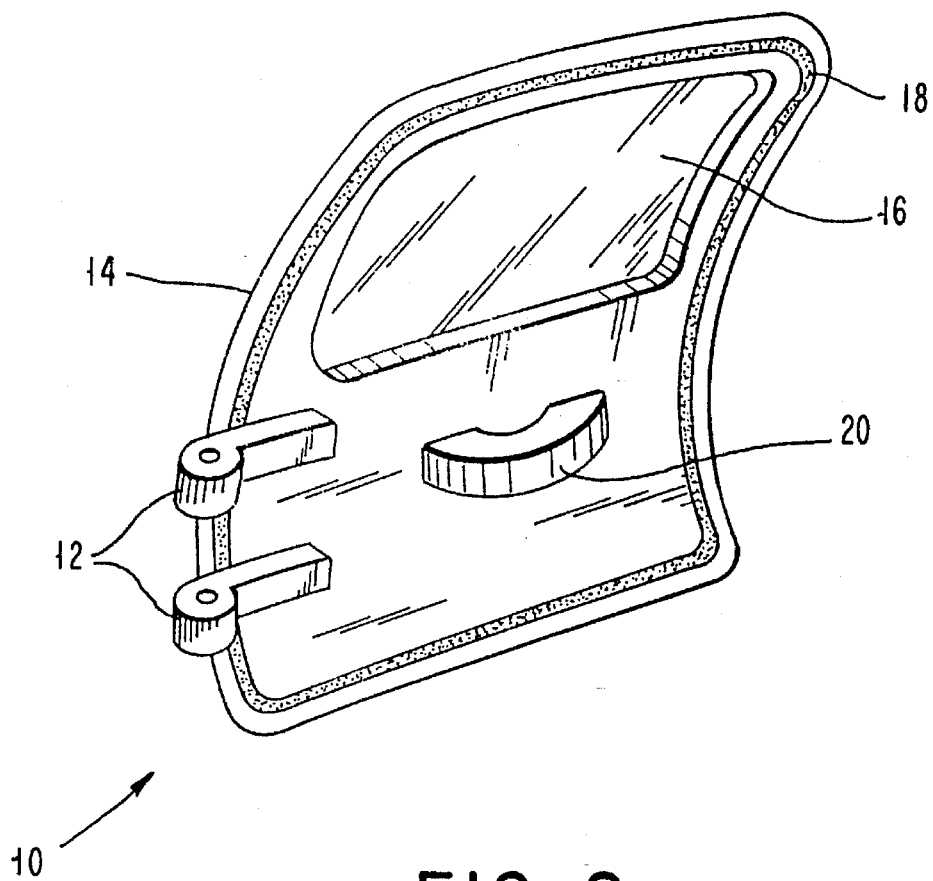
FIG. 1 shows an RPS object, for example a door frame, comprising pre-selected portions, each portion specifying desired characteristics to be realized in accordance with the method of the present invention.
Figure 2:
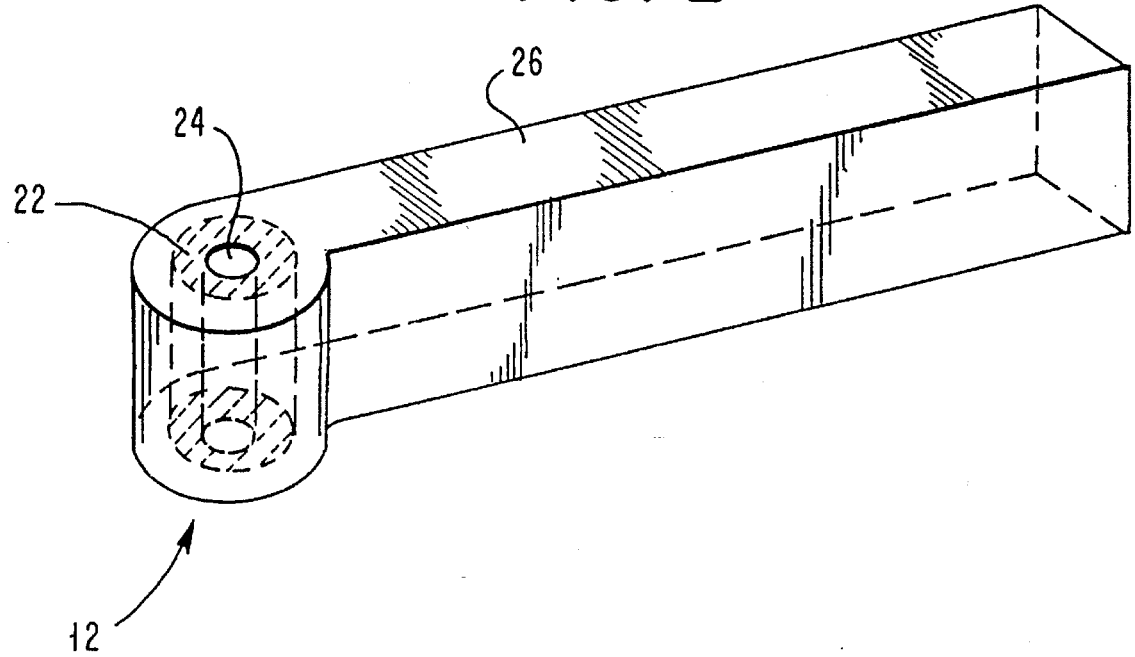
FIG. 2 shows a detail of an RPS object comprising pre-selected portions, each portion specifying desired characteristics to be realized in accordance with the method of the present invention.

Attention is first directed to FIG. 7, which shows an RPS object 10 comprising preselected geometric portions 12, 14, 16, 18, and 20. By way of a running example for the rest of this disclosure, it is specified that object 10 is a door, object 12 is a hinge, object 14 is a skin panel, object 16 is a window, object 18 is a gasket, and object 20 is a handle. In FIG. 2 object 12 is further sub-divided into preselected geometric portions 22, 24, and 26. Again by way of a running example for the rest of this disclosure, it is specified that object 22 is the hinge pivot bushing, object 24 is the hinge pill hole, and object 26 is the hinge support bracket.

Table I in FIG. 3 gives the specifications supplied with the CAD design for object 10 for a variety of physical characteristics of each of the preselected objects. Note that some of these specifications are defaults, some are restrictive in several parameters, and some are stated as necessary minima or maxima. For this example, the specifications are motivated by the need that the door be light weight (hence the low skin density), resistant to fracture (hence the high elongation to yield of the skin, window, and hinge bracket), long wearing (hence the high modulus of the hinge bushing), comfortable (hence the soft handle), weather tight (hence the low durometer gasket), and visually functional (hence the transparent window and red skin).

Table II in FIG. 4 gives the characteristics for stock materials which are available for use in prototyping the CAD object. Note that this table is not complete; in addition there is required information such as mutual compatibilities of each of the different materials (including compatibility with itself), specialized deposition characteristics necessary for operating in the RPS apparatus (such as temperature, viscosity, feed rates, and similar parameters), and other considerations important once the object has been fabricated (such as cost, machinability, oxidation rates, weather compatibility, MSDS information, and lot number).

Figure 5:
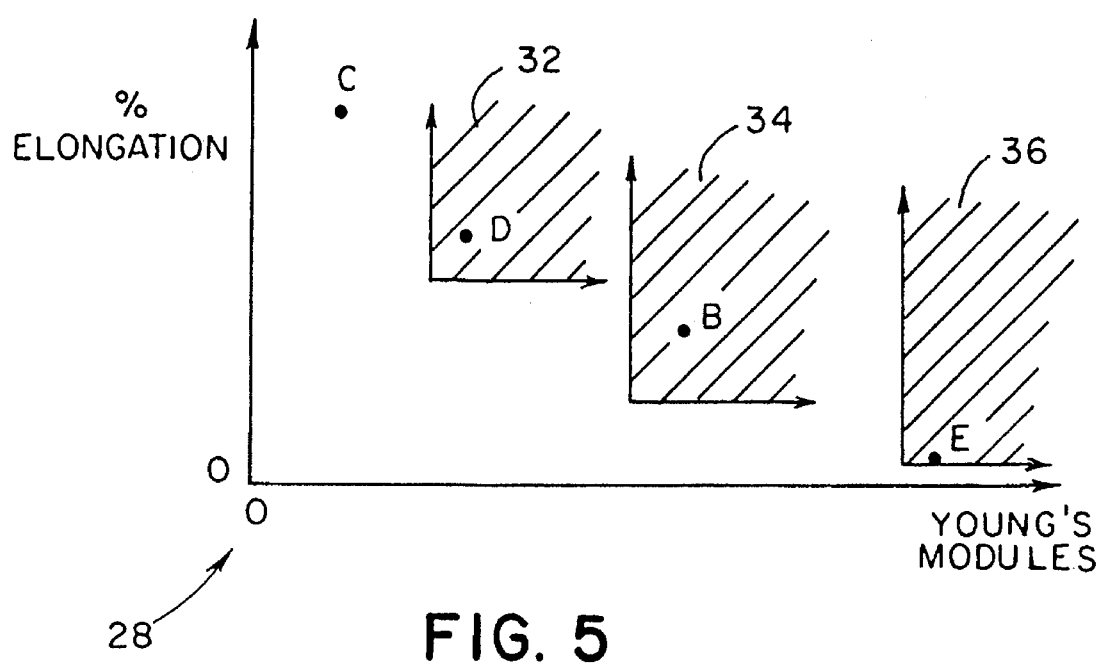
FIG. 5 shows a mathematical-physical object characteristic space developed as an heuristic to explain the method of the present invention.
Figure 6:
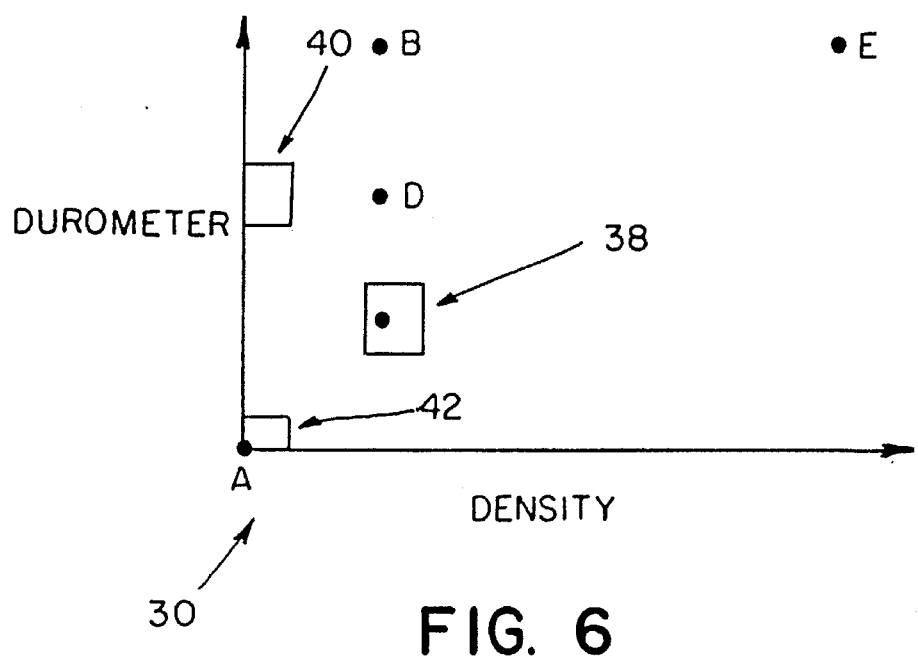
FIG. 6 shows a second mathematical-physical object characteristic space developed as an heuristic to explain the method of the present invention.

The first step of the novel method comprises identifying an object characteristic space comprising at least one dimension, the or each dimension defining a continuum for one object parameter. FIG. 5 is illustrative of such all object characteristic space 28 comprising two dimensions. In particular, one dimension defines a continuum for Young's modulus E, and a second dimension defines a continuum for percent elongation. FIG. 6 is illustrative of such an object characteristic space 30 for two additional dimensions. In particular, one dimension defines a continuum for density, and a second dimension defines a continuum for durometer. Additional dimensions, not shown, may be dedicated to parameters including e.g., flexibility, softness, tackiness, brittleness, conduction, elasticity, economic cost and buoyancy.

Note that a continuum may be dedicated, on the one hand, to gradations of a single measurable property; e.g., Young's Modulus going from soft to rigid. On the other hand, a continuum may be dedicated to expressions of multiple attributes of identifiable entities; e.g., conjunctions of hard/sticky or cost/color, etc.

The second step of the novel method comprises selecting a predetermined subset of the object characteristic space comprising desired optimal characteristics of the preselected portion of the object. FIG. 5, in particular, shows a predetermined subset comprising a manifold 32 which subsumes the necessary parameters for objects 14 and 16 in this projection. FIG. 5 also shows a predetermined subset comprising a manifold 34 which subsumes the necessary parameters for object 26 in this projection, and similarly manifold 36 which subsumes the necessary parameters for object 22 in this projection. FIG. 6 shows a predetermined subset comprising a manifold 38 which subsumes the necessary parameters for object 18 in this projection, and similarly a manifold 40 which subsumes the necessary parameters for object 20, and a manifold 42 which subsumes the necessary parameters for object 24.

A choice of which stock material to use in which location and orientation in the object is preferably determined in accordance with the following steps (a) through (h).

Step (a) comprises identifying the desired characteristics of a preselected portion of an object to be constructed. This is completed, for example, in Table I.

With respect to step (a), note firstly that different regions of an object may be independently specified. For example, recall from above that a prototype car frame may require stiff attachment zones, but contiguous soft crumple zones. In the running example, even within the geometric region of the hinge, individual regions of the hinge bushing, the hinge bracket, and the hinge hole are identified. A designer, accordingly, preferably identifies these material characteristics as part of a CAD file, as well as any other applicable characteristics. Characteristics that are not identified by the CAD designer can be assigned by the RPS system to optimize general requirements of strength, cost, and speed.

Note further, as is usual with composites, that it is possible that a characteristic has a vector nature: for example, a characteristic may comprise compressive strength in one direction and tensile strength in a plane normal to that direction. On the other hand, some characteristics are specified as uniform throughout the entire object, and need not be regionally specified.

Note finally, that these characteristics need not be manually assigned. For example, if a designer prefers to depart from default characteristics, he may specify functional requirements for the object (loads, strains, weight and so forth) and look to conventional numerical analysis packages to map characteristics appropriately throughout the object.

Step (b) comprises scanning through a menu of available extrusion materials to see if, taken one characteristic at a time, available homogenous stock materials form a superset that bracket each specified characteristic, assuming an optimal bead orientation. Restated, step (b) asks the question: Assuming that an object portion is purely of all optimal stock material oriented in an optimal way, can the specified characteristic be met?

FIGS. 5 and 6 show how the individual characteristics of the homogeneous stock materials map onto the manifolds of specifications for the different object regions. In particular, we see that material D satisfies manifold 32, material B manifold 34, material E manifold 36, material C manifold 38, and material A manifold 42. Note that no material directly satisfies manifold 40 in FIG. 6; however taken one characteristic at a time, materials A and D satisfy the durometer and density specifications for manifold 40. We find that step (b) is satisfied for the object regions and stock materials specified, (Note that Table II lists homogenous stock materials. By this, we intend only to differentiate stock materials from a composite comprising combinations of different stock materials: the stock materials themselves may be non-homogenous. For example, for our purposes, a homogenous stock material may include filler particulates, be coaxial co-extrusions of dissimilar materials (like a bismuth solder coated with a flexing agent), be mixtures of immersible polymer, and/or contain pigment or contain oriented molecules.)

Table III in FIG. 7 shows by way of the running example the sorting performed by step (b) when applied to all of the different object regions.

Note that if no available homogeneous material intrinsically has a Young's modulus that is as high as is locally required, it is likely that no composite can achieve the required Young's modulus. In this case, one preferably stops the automatic process, and reports to the designer either a more relaxed performance desideratum, or extends the menu for additional stock materials. In this regard, since air is a valid material and has a Young's modulus of zero, a lower bracketing value of zero can always be found. For other parameters, such as thermal conductivity, for example, it is possible to specify a local characteristic that is smaller than that of any stock material.

In general, if step (b) cannot be realized, i.e., there are specified characteristics that cannot be spanned by any available stock material with acceptable tolerances, one can optionally seek additional materials for addition to the menu, or oblige the designer to allow iterative compromise solutions.

Step (c) is a subsumed moment to step (b), and comprises checking to see if any individual stock materials meets all the regional characteristics within specified tolerances, independent of orientation. If so, all extruded beads in that region preferably are of that material, and the trajectories of the beads can be computed, ignoring material characteristic requirements.

Table IV in FIG. 8 shows the result of applying step (c) in the running example. The specifications of three of the object regions are satisfied by using single stock materials within those regions independent of orientation of those materials. Those materials are therefore assigned to those regions, and those regions are not considered in the remaining steps. Note that materials may fail to function as single region components due to characteristics not listed in Table III. For example, material B satisfies all of the listed characteristics for the skin panel; it however has insufficient self-adhesion during the RPS process to perform as a single component material. Similar processing restrictions prevent material E from being assigned to the hinge bushing, and material D from being assigned to the hinge bracket in step (c).

Step (d) is also a subsumed moment to step (b), and comprises checking to see if any individual stock material meets all the regional requirements, within specified tolerances, assuming optimal orientation. If so, necessary geometric orientations of the beads should be passed along to the software that generates the actual bead trajectories.

In the running example, none of the characteristics were satisfied by additionally requiring orientation of single stock materials, so step (d) has no effect.

Step (e) comprises checking to see if pair wise combinations of available stock materials can meet the regional characteristics within specified tolerances, independent of bead orientation.

Step (e) can be restated ill the following way. Extruded composites of a given pair of materials can produce different characteristics depending on their fractional contribution and the bead orientations. Thus, for a worst case orientation, are there any combinations of these two stock materials that can provide the specified characteristics? If yes, a bead size ratio may be provided to the trajectory generations software, and apart from causing nearest neighbor beads to alternate between these two materials, trajectories may be determined without considering material properties.

Table IV in FIG. 8 shows that step (e) would conclude in the running example that object 14 can be made up of a pair of stock materials. More specifically, there is sufficient Young's modulus in the polystyrene stock material that it can be combined with clear ethyl vinyl acetate (EVA) copolymers to make a red skin material of sufficient rigidity, with the EVA forming the necessary adhesion between the beads. Since the modulus parallel to the local bead axis orientation is dominated by the material with the higher modulus, while the modulus perpendicular to the local bead axis is dominated by the material with the lower modulus, the hinge bushing and hinge bracket cannot be assembled by any randomly oriented pair wise combination of the given stock materials.

Step (f) is a subsumed moment of step (e), and comprises checking to see if pair wise combinations of available stock materials can meet the regional specified characteristics within specified tolerances, assuming optimal bead orientation. Step (f) repeats step (e), this time assuming that beads can be oriented so that their best case characteristics are acting towards following a required specified characteristic. Restated, step (f) asks the question: Assuming the beads are optimally oriented, is there a ratio of the two stock materials that satisfies all the required specified characteristics? If yes, the method dictates providing the trajectory generations software with the ratio and bead orientation requirements for that region.

In the running example, Table IV in FIG. 8 shows the result of applying step (f). Beads oriented along the length of the hinge bracket achieve the required modulus and elongation with alternating polystyrene and EVA. Beads oriented circumferentially around the hinge pin hole achieve the required modulus and elongation when composed alternately of Cerrobend and EVA.

Step (g) comprises checking to see if three or more available stock materials can meet the regional characteristics within specified tolerances. Step (g), accordingly, is preferably implemented when steps (a) through (f) are found to be otiose.

Generally a search through three way combinations is prohibitively complex, although there are some important exceptions. For example, a strong light object can be produced by a honeycomb of beads comprising a strong first stock material cemented together by beads of an adhesive second shock material surrounding cavities of a third stock material (air). Again, to generate arbitrary optically perceived colors, it is necessary to composite three (sometimes two) primary colors plus black.

In the running example, no simple three way combinations of stock materials can be combined to produce the remaining region, the handle. This is because the only red material is also too stiff to allow a low durometer region to be constructed.

Step (h) comprises checking to see if the region might be constructively broken up into new subregions to allow the region to be printed. As in step (g), this generally is too complex to be solved automatically. However there are a number of important situations that can be tested. Each characteristic has a geometric nature; density is a volumetric property independent of orientation, color is a surface property independent of orientation, and durometer is a bulk property dependent on bead direction. If characteristics are in conflict for a given region that have different geometric properties, it is worth while to sub-divide the region based on those properties.

In the running example, the properties of color and durometer are the ones in conflict. This suggests that the handle be sub-divided into two regions; the surface of the handle (one bead layer thick), and the volume of the handle (the original geometry minus the surface layer). Table IV of FIG. 8 shows that these two sub-regions are then recirculated back to the beginning of the method. The method then passes these sub-regions down to step (e), where they are assigned non-oriented pair-wise stock materials. Air is used to reduce the density of the stock EVA low durometer material. EVA and red polystyrene are used to give a red surface to the part.

In sum, it is quite likely that an object can have significant differences in regional characteristics, thus requiring different combinations of stock materials for each region. The total number of stock materials can be therefore quite high, while still considering generally three or less stock materials for any one part region or zone.

Step (i), finally, addresses the situation when steps (e) through (h) are found to be otiose. Step (i) therefore comprises returning to the step (a) characteristics assignment process to thereby open the tolerances, change the requirements, or suggest the need for a new class of stock material.

Figure 9B:
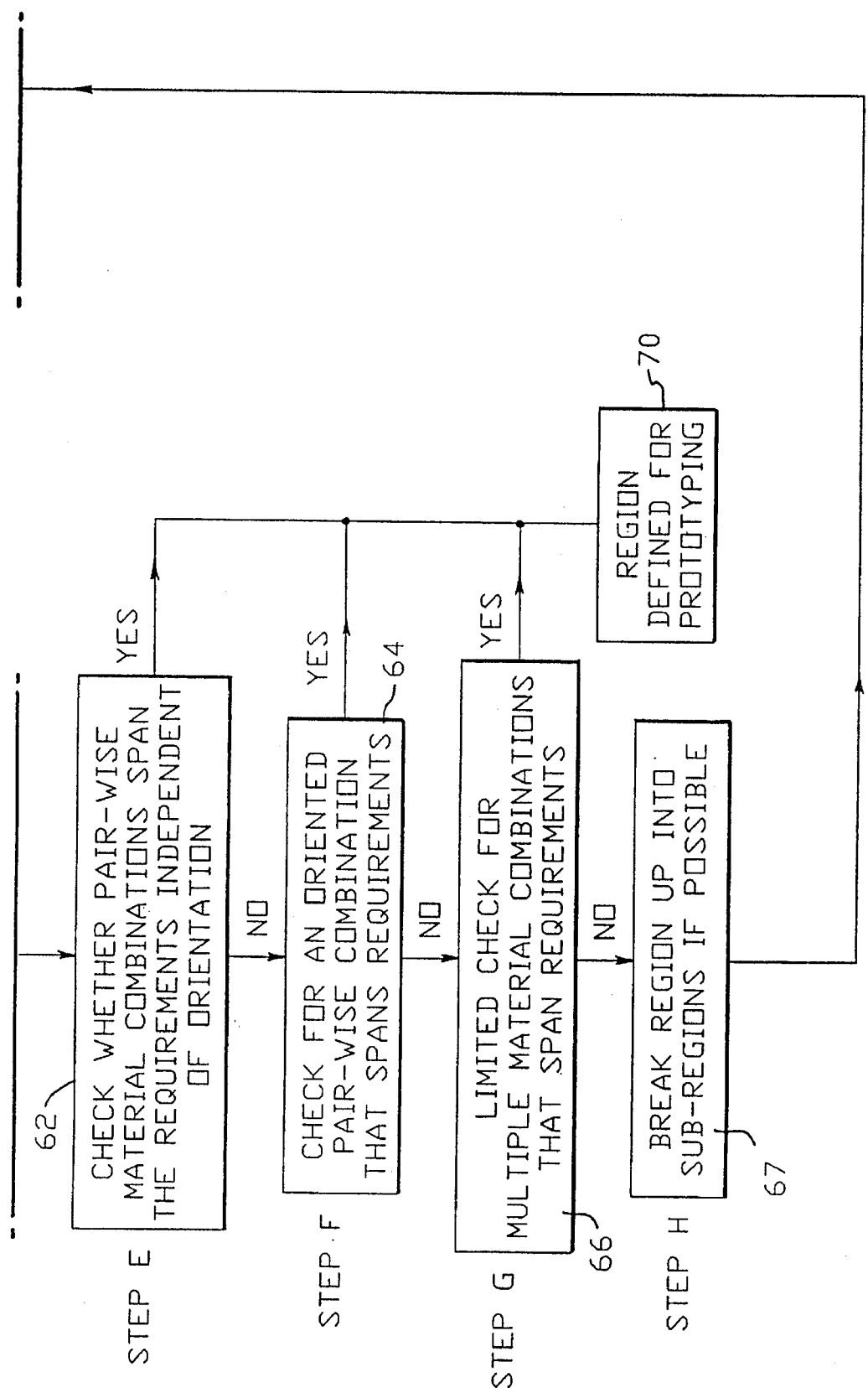
FIG. 9 indicates a composite of FIGS. 9A and 9B which collectively show a flowchart comprising a compendium of the steps of the method of the present invention.

Attention is finally directed to FIG. 9, which sets out a flowchart 44 that recapitulates in boxes 46–70, steps of the novel method. Realization of the steps disclosed in the flowchart 44 are preferably obtained by a computer implementation, while the actual object development may be done alternatively by extrusions of a flowable material, sheet lamination, particle sintering, ink jets and their relatives (ballistic particles, hot wax and others), plasma spray, photopolymerization or arc welding.

EXAMPLE

The invention is illustrated in the following example, which illustrates, in accordance with the instant method, a step of fabricating a heterogeneous object by extrusion such that different regions of the object comprise distinct physical properties. In general, high glass transition temperature thermoplastics have good strength (Young's modulus) and low adhesion, while materials with low glass transition temperatures are soft but have good adhesion (e.g., hot melt adhesives). Since adhesion is an interfacial requirement, it is possible to construct a composite material by alternating beads of high and low glass transition temperature that, taken as a whole, have both good adhesion (resistance to delatimation) and strength (Young's modulus).

Two geometrically similar structures were built. One contained 14 all hot melt adhesive beads stacked to form a wall, and the other contained 7 hot melt adhesive beads alternated with 7 polystyrene beads. The dimensions of the two wall structures were:

| Uniform hot melt composition | | | Hot melt/polystyrene lattice | | | |
|---|---|---|---|---|---|---|
| $x_u$: | = | 4.8  0.0254 | $x_1$: | = | 4.8  0.0254 | meters |
| $y_u$: | = | 0.21  0.0254 | $y_1$: | = | 0.20  0.0254 | meters |
| $z_u$: | = | 0.016  0.0254 | $z_1$: | = | 0.018  0.0254 | meters |

To estimate Young's modulus of either combination, the structures were sandwiched between two aluminum plate 0.020" apart (to keep them from buckling under load) so that they spanned two pins spaced L apart.

| L: | = | 2.00  0.0254 | Span of test beam, meters |
|---|---|---|---|

The force required to deflect each beam was measured.

| $\delta$: | = | 0.038  0.0254 | Deflection of center of beam, meters |
|---|---|---|---|
| $f_u$: | = | 0.20 | $f_1$: = 1.40  force, Newtons |

The moments of inertia in both case were $$I_u = z_u \frac{y_u^3}{12} \qquad I_1 = z_1 \frac{y_1^3}{12}$$

Assuming the modulus to be the same in tension and compression, we found $$E_u = f_u \frac{L^3}{48} I_u \delta \qquad E_1 = f_1 \frac{L^3}{48} I_1 \delta$$

The effective Young's modulus in Newtons per square meter was

| $E_u$ | = | $1.101 10^8$ | $E_1$ | = | $7.931 10^8$ | |
|---|---|---|---|---|---|---|
| $E_u 0.000145$ | = | $1.597 10^4$ | $E_1 0.000145$ | = | $1.151 10^5$ | p.s.i |

Adding the polystyrene to every other bead stiffened the wall by about a factor of 10, and put the final Young's modulus within a factor of about 3 of a nominal bulk value from the literature (390,000 psi).

What is claimed:

1. A method suitable for optimizing parameters which are characteristic of a preselected portion of an object comprising composites of different homogenous materials developed in a material extrusion system, which method comprises the steps of:
   (1) identifying an object characteristic space comprising at least one dimension, the or each dimension defining a continuum represented by gradations of a single measurable property for one object parameter; and
   (2) selecting a predetermined subset of said object characteristic space comprising desired optimal characteristics of the preselected portion of the object; so that when an object is fabricated by extrusion, it comprises the desired optimal characteristics.

2. A method according to claim 1, wherein a continuum is dedicated to expressions of multiple attributes of identifiable entities.

3. A method according to claim 1, wherein the object characteristic space comprises three dimensions, and wherein one each of the three dimensions is dedicated to the group consisting of Young's modulus, density and durometer.

4. A method according to claim 1 wherein step 1 comprises a preceding event comprising identifying desired characteristics of a preselected portion of an object to be constructed.

5. A method according to claim 4, further comprising the step of scanning through a menu of available extrusion materials to ascertain if, taken one characteristic at a time, available homogenous stock materials form a superset that bracket each identified characteristic.

6. A method according to claim 5, further comprising the step of ascertaining if pair wise combinations of available stock materials can meet regional characteristics within specified tolerances, upon a default of possible such homogeneous stock materials.

7. A method according to claim 6, further comprising the step of ascertaining if three or more available stock materials can meet regional characteristics within specified tolerances, upon a default of possible pair wise combinations of such available stock materials.

8. A method according to claim 7, further comprising the step of constructively breaking up and redefining the preselected portion of the object, in default of possible three plus stock material combinations.

9. A method according to claim 8, further comprising the step of redefining the specification of desired optimal characteristics, in default of redefining preselected portions of the object.

10. A method according to claim 1, comprising the step of fabricating a heterogeneous object by extrusion such that different regions of the object comprise distinct physical properties.

* * * * *